(12) United States Patent
Fischer et al.

(10) Patent No.: US 9,576,245 B2
(45) Date of Patent: Feb. 21, 2017

(54) IDENTIFYING ELECTRIC VEHICLE OWNERS

(71) Applicant: Opower, Inc., Arlington, VA (US)

(72) Inventors: Barry Fischer, San Francisco, CA (US); Benjamin David Harack, San Francisco, CA (US)

(73) Assignee: O POWER, INC., Arlington, VA (US)

( * ) Notice: Subject to any disclaimer, the term of this patent is extended or adjusted under 35 U.S.C. 154(b) by 239 days.

(21) Appl. No.: 14/574,010

(22) Filed: Dec. 17, 2014

(65) Prior Publication Data

US 2016/0055419 A1 Feb. 25, 2016

Related U.S. Application Data

(60) Provisional application No. 62/040,959, filed on Aug. 22, 2014.

(51) Int. Cl.
*G06N 99/00* (2010.01)
*G06N 5/04* (2006.01)

(52) U.S. Cl.
CPC ............... *G06N 5/048* (2013.01); *G06N 99/00* (2013.01)

(58) Field of Classification Search
None
See application file for complete search history.

(56) References Cited

U.S. PATENT DOCUMENTS

| | | |
|---|---|---|
| 4,334,275 A | 6/1982 | Levine |
| 4,843,575 A | 6/1989 | Crane |
| 5,513,519 A | 5/1996 | Cauger et al. |
| 5,566,084 A | 10/1996 | Cmar |
| 5,717,609 A | 2/1998 | Packa et al. |
| 5,855,011 A | 12/1998 | Tatsuoka |
| 5,873,251 A | 2/1999 | Iino |
| 5,930,773 A | 7/1999 | Crooks et al. |
| 5,948,303 A | 9/1999 | Larson |
| 6,035,285 A | 3/2000 | Schlect et al. |

(Continued)

FOREIGN PATENT DOCUMENTS

| | | |
|---|---|---|
| AU | 2010315015 | 7/2014 |
| CA | 2779754 | 5/2011 |

(Continued)

OTHER PUBLICATIONS

Nemry, et al., Plug-in Hybrid and Battery Electric Vehicles Market penetration scenarios of electric drive vehicles, European Commission, Draft technical note JRC-IPTS—Jun. 2010, pp. 1-36.*

(Continued)

*Primary Examiner* — Wilbert L Starks

(57) ABSTRACT

The subject disclosure relates to methods and systems for identifying and classifying electric-vehicle (EV) owners. Methods of the subject technology can include steps for generating an initial model based on a plurality of load-curve characteristics, and training the initial model using a training data set to produce a configured model. In some implementations, the methods can also include steps for determining a probabilistic classification for each of a second plurality of users by analyzing load-curve data associated with the second plurality of users using the configured model. Systems and computer readable media are also provided.

20 Claims, 4 Drawing Sheets

(56) References Cited

U.S. PATENT DOCUMENTS

| | | |
|---|---|---|
| 6,088,688 A | 7/2000 | Crooks et al. |
| 6,295,504 B1 | 9/2001 | Ye et al. |
| 6,327,605 B2 | 12/2001 | Arakawa et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| 7,991,513 B2 | 8/2011 | Pitt |
| 8,065,098 B2 | 11/2011 | Gautam |
| 8,166,047 B1 | 4/2012 | Cohen et al. |
| 8,180,591 B2 | 5/2012 | Yuen et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| 8,583,288 B1 | 11/2013 | Rossi et al. |
| 8,630,741 B1 | 1/2014 | Matsuoka et al. |
| 8,660,813 B2 | 2/2014 | Curtis et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| D714,335 S | 9/2014 | Cojuangco et al. |
| D729,268 S | 5/2015 | Nies et al. |
| 9,031,703 B2 | 5/2015 | Nakamura et al. |
| D740,847 S | 10/2015 | Yampolskiy et al. |
| 2001/0047290 A1 | 11/2001 | Petras et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0103549 A1 | 5/2006 | Hunt et al. |
| 2006/0195438 A1 | 8/2006 | Galuten |
| 2006/0246968 A1 | 11/2006 | Dyke-Wells |
| 2007/0061735 A1 | 3/2007 | Hoffberg et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0167535 A1 | 7/2008 | Stivoric et al. |
| 2008/0195561 A1 | 8/2008 | Herzig |
| 2008/0244429 A1 | 10/2008 | Stading |
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 | 12/2008 | Murray et al. |
| 2009/0106202 A1 | 4/2009 | Mizrahi |
| 2009/0106674 A1 | 4/2009 | Bray et al. |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0241648 A1 | 9/2010 | Ito et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |
| 2011/0178842 A1 | 7/2011 | Rane et al. |
| 2011/0178937 A1 | 7/2011 | Bowman |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0282505 A1 | 11/2011 | Tomita et al. |
| 2011/0313964 A1 | 12/2011 | Sanchey Loureda et al. |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |
| 2012/0084063 A1 | 4/2012 | Drees et al. |
| 2012/0179692 A1 | 7/2012 | Hsiao et al. |
| 2012/0215369 A1 | 8/2012 | Desai et al. |
| 2012/0216123 A1 | 8/2012 | Shklovskii et al. |
| 2012/0259678 A1 | 10/2012 | Overturf et al. |
| 2012/0290230 A1 | 11/2012 | Berges Gonzalez et al. |
| 2012/0310708 A1 | 12/2012 | Curtis et al. |
| 2013/0060531 A1 | 3/2013 | Burke et al. |
| 2013/0060720 A1 | 3/2013 | Burke |
| 2013/0097481 A1 | 4/2013 | Kotler et al. |
| 2013/0173064 A1 | 7/2013 | Fadell et al. |
| 2013/0253709 A1 | 9/2013 | Renggli et al. |
| 2013/0261799 A1 | 10/2013 | Kuhlmann et al. |
| 2013/0262040 A1 | 10/2013 | Buckley |
| 2014/0006314 A1 | 1/2014 | Yu et al. |
| 2014/0019319 A1 | 1/2014 | Derby et al. |
| 2014/0074300 A1 | 3/2014 | Shilts et al. |
| 2014/0107850 A1 | 4/2014 | Curtis |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0337107 A1 | 11/2014 | Foster |
| 2015/0227522 A1 | 8/2015 | O'Donnell et al. |
| 2015/0227846 A1 | 8/2015 | Mercer et al. |
| 2015/0254246 A1 | 9/2015 | Sheth et al. |
| 2015/0267935 A1 | 9/2015 | Devenish et al. |
| 2015/0269664 A1 | 9/2015 | Davidson |
| 2015/0310019 A1 | 10/2015 | Royer et al. |
| 2015/0310463 A1 | 10/2015 | Turfboer et al. |

(56) References Cited

U.S. PATENT DOCUMENTS

| | | |
|---|---|---|
| 2015/0310465 A1 | 10/2015 | Chan et al. |
| 2015/0324819 A1 | 11/2015 | Lin et al. |
| 2015/0326679 A1 | 11/2015 | Lin et al. |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Search Report and Written Opinion for PCT Application No. PCT/US2015/038692, mailed Sep. 24, 2015, 13 pages.
International Preliminary Report on Patentability for PCT Application No. PCT/US2010/055621, mailed May 15, 2012, 8 pages.
International Search Report and Written Opinion for PCT Application No. PCT/US2010/055621, mailed Dec. 23, 2010, 9 pages.
International Search Report and Written Opinion for PCT Application No. PCT/US2012/036539, mailed Jul. 6, 2012, 8 pages.
International Preliminary Report on Patentability for PCT Application No. PCT/US2012/036539, mailed Nov. 21, 2013, 7 pages.
International Search Report and Written Opinion for PCT Application No. PCT/US2013/046126, mailed Aug. 22, 2013, 9 pages.
International Preliminary Report on Patentability for PCT Application No. PCT/US2013/046126, mailed Jan. 8, 2015, 8 pages.
International Search Report for PCT Application No. PCT/US2014/036901, mailed Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/200.
Author Unknown, "CoolClimate Calculator," May, 19,2008, 15 pages, available at http://web.archive.orgi/web/20080519220643/bie.berkeley.edu/coolcale/calculations.html.
Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.
Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages.," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Friedman, Jerome, et al., "Regularization Paths for Generalized Linear Models via Coordinate Descent," Journal of Statistical Sotfware, vol. 33, Iss. 1, pp. 1-22, Jan. 2010.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.
Liang, Jian, et al. "Load Signature Study—Part II: Disaggregation Framework, Simulation, and Applications," IEEE Transactions on Power Delivery, vol. 25, No. 2, pp. 561-569, Apr. 2010.
Liang, Jian, et al., "Load Signature Study—Part I: Basic Concept, Structure, and Methodology," IEEE Transactions on Power Delivery, vol. 25, No. 2, pp. 551-560, Apr. 2010.
Mint.com, "Budgets you'll actually stick to," Budgeting—Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.

(56) References Cited

OTHER PUBLICATIONS

Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f.. uelband, 7 pages, Jul. 15, 2013.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.

\* cited by examiner

IDENTIFYING ELECTRIC VEHICLE OWNERS

CROSS-REFERENCE TO RELATED APPLICATIONS

This application claims the benefit of U.S. Provisional Application No. 62/040,959 filed Aug. 22, 2014, entitled "IDENTIFYING ELECTRIC VEHICLE OWNERS," which is incorporated herein by reference.

BACKGROUND

1. Technical Field

The subject technology relates to methods and systems for disaggregating electric-vehicle (EV) consumption from other types of power consumption and in particular, for discriminating between EV owners and non-EV owners using Advanced Metering Infrastructure (AMI) data.

2. Introduction

Recent advancements in certain industries, such as the electric automobile industry, are increasing demand on the power grid due to the significant energy requirements of battery charging. As a result, one trend in electricity consumption for electric-vehicle owners is that power consumption can shift dramatically at unpredictable times throughout the day, e.g., whenever automobiles are plugged in for charging.

SUMMARY

In certain aspects, the disclosed subject matter relates to a computer-implemented method for distinguishing electric-vehicle owners ("EV owners") from non-owners. Methods of the subject technology can include steps for generating an initial model based on a plurality of power load-curve characteristics and training the initial model using a training data set to produce a configured model, wherein the training data set comprises load-curve data associated with a first plurality of users for whom electric-vehicle ownership status is known. Additionally, in some aspects, the method can further include steps for determining a probabilistic classification for each of a second plurality of users by analyzing load-curve data associated with the second plurality of users using the configured model.

In another aspect, the disclosed subject matter relates to a system for classifying electric-vehicle (EV) ownership status, the system including one or more processors, and a computer-readable medium including instructions stored therein, which when executed by the processors, cause the processors to perform operations including: receiving usage interval data associated with a first plurality of users for whom an EV ownership status is unknown, analyzing the usage interval data to identify one or more potential EV charging characteristics, and comparing the one or more potential EV charging characteristics to a set of reference characteristics. In some aspects, the processors can be further configured for identifying at least one EV owner from among the first plurality of users based on the comparison of the one or more potential EV charging characteristics to the set of reference characteristics.

In yet another aspect, the subject technology relates to a non-transitory computer-readable storage medium including instructions stored therein, which when executed by one or more processors, cause the processors to perform operations including: receiving usage interval data associated with a first plurality of users for whom an EV ownership status is unknown, analyzing the usage interval data to identify one or more potential EV charging characteristics, and comparing the one or more potential EV charging characteristics to a set of reference characteristics. In certain aspects, the operations can further include, identifying at least one EV owner from among the first plurality of users based on the usage interval data and the set of reference characteristics.

It is understood that other configurations of the subject technology will become readily apparent to those skilled in the art from the following detailed description, wherein various configurations of the subject technology are shown and described by way of illustration. The subject technology is capable of other and different configurations and its several details are capable of modification in various respects without departing from the scope of the subject technology. Accordingly, the detailed description and drawings are to be regarded as illustrative and not restrictive in nature.

BRIEF DESCRIPTION OF THE DRAWINGS

Certain features of the technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
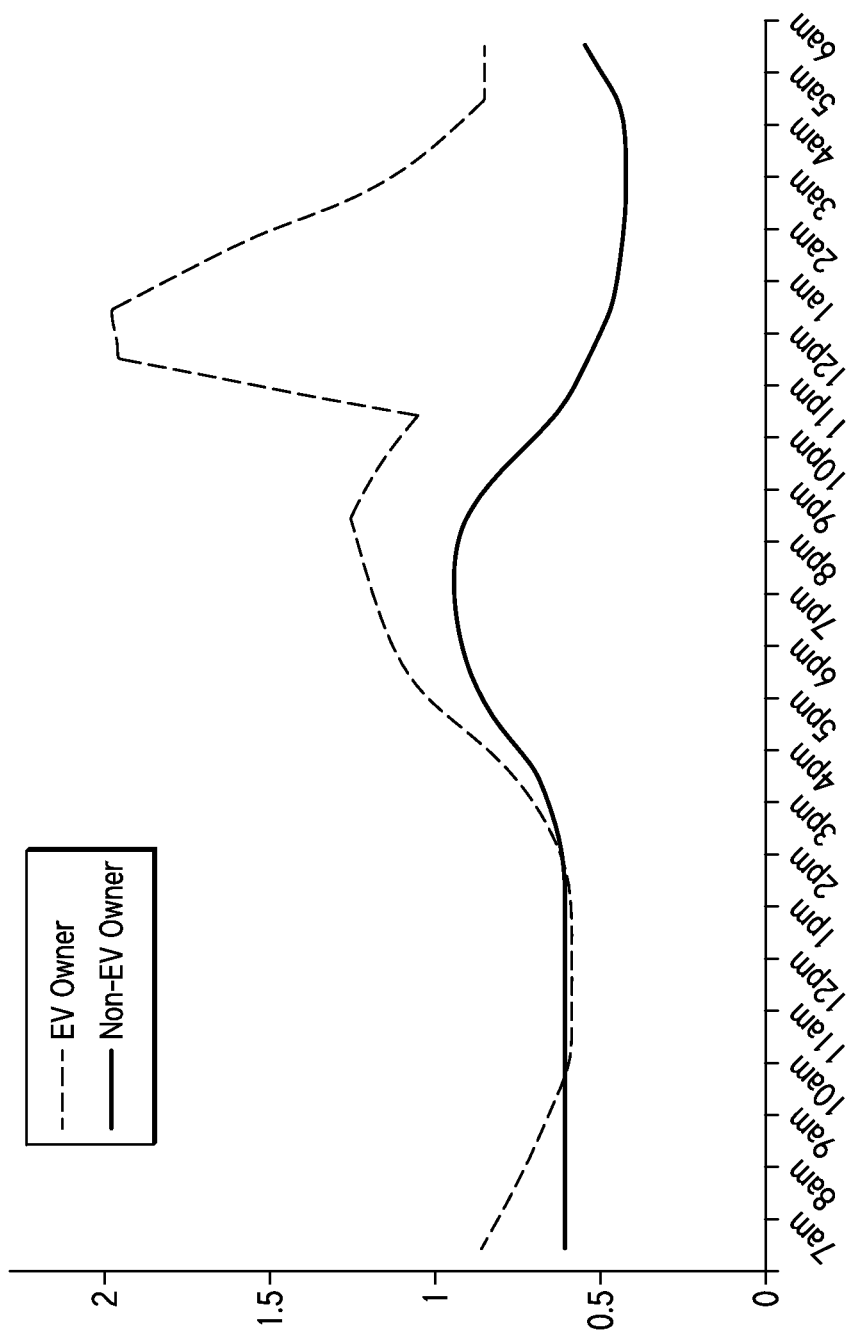
FIG. 1 conceptually illustrates example differences in power load-curves between electric-vehicle (EV) owners and non-EV owners.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Although it would be advantageous to identify electric-vehicle owners using power consumption data, current methods do not provide reliable disaggregation models capable of distinguishing electric-vehicles from other appliances, such as heating, ventilating and air conditioning (HVAC) systems. The failure of disaggregation methods to perform reliable disaggregation for EVs is, at least in part, due to the fact that the models employed are unable to account for idiosyncratic changes in power consumption associated with EV charging.

Aspects of the subject technology address the foregoing limitations of disaggregation models and provide a way to reliably detect electric-vehicle charging and therefore infer an EV ownership status. In certain implementations, probabilistic machine-learning models are constructed, for example, using training data sets for which electric-vehicle ownership (or a lack thereof) is already known. Once a model is constructed and tuned (trained), it can be used to provide predictions (relating to EV ownership status) based on power consumption data for users whose electric-vehicle ownership status is unknown.

In other implementations, pattern matching techniques can be used, for example to detect certain power-consumption anomalies or characteristics associated with EV charging, and inferentially, a positive EV ownership status. Some characteristics of usage interval data (e.g., load curve data) that are likely among EV owners include, but are not limited to: increases/decreases in power load by certain predetermined amounts (e.g., 1-2 kW/h), a particularly frequency of such increases/decreases, and a spacing (in time) between such events. Power consumption of certain amounts (e.g., 1-2 kW) during off-peak hours can also correlate with EV charging, since in certain geographic locations, or in certain weather conditions, users are less-likely to activate a Heating Ventilating Air Conditioning (HVAC) system during certain hours (e.g., off-peak hours).

Calculation of a high probability of electric-vehicle ownership can precipitate the sending of personalized communications to an associated user/entity, for example, to invite the user to subscribe to rate plans or rebate programs relevant to electric-vehicle owners. Additionally, in some instances, affirmative responses or acceptance into a rebate program can signal a properly classified electric-vehicle owner, providing feedback/training for the prediction model.

Predictive models can be constructed using various assumptions, weights and/or characteristics, depending on the implementation. For instance, predictive models can be based on characteristics of power load-curves associated with electric-vehicle ownership. Various types of power consumption data may be used, such as interval data that is collected hourly, or at another regular time interval such as every 15 minutes. In at least one implementation, a predictive model of the subject technology can use Advanced Metering Infrastructure (AMI) data. By way of example, such characteristics can include one or more of: usage spikes, usage drop-offs, usage profiles, weather independence and/or cadence. In some aspects, predictive models can also be based on other load-curve independent factors for a particular consumer, or group of consumers, including, but not limited to demographic information such as: geographic location, income level, housing size, pool ownership, and/or solar system ownership, etc.

In some aspects, a trained prediction model can employ pattern recognition techniques, for example, to discern or identify features that may be unique to, or highly correlated with, EV ownership. By way of example, increases in a power load curve for a particular household by a certain amount may indicate that an EV has been plugged in for charging. Similarly, attenuation in the same power load curve, within a predetermined time frame, may indicate that charging has stopped, due to the EV battery reaching a full-charge state.

Additionally, the above increases and decreases in the load-curve may be separated by predictable amounts of time (for EV owners) due to the patterns in which EV battery charging are performed. By way of example, an EV owner who has fully recharged his/her EV battery will be less likely to resume charging immediately thereafter, but increasingly likely to resume charging as time passes. Thus, certain features in the load curve data, such as predictably spaced increases and/or decreases in power consumption, can be used to identify potential EV owners.

FIG. 1 conceptually illustrates an example of differences in power load-curves between EV owners and non-EV owners, according to some aspects. For example, a load-curve for an EV owner (represented by the dotted line) may tend to exhibit certain shapes and/or patterns not present in load-curves for non-EV owners (e.g., represented by the solid line).

Due to common power draw characteristics of EV batteries, predictable changes in AMI data can be correlated with the connection of an EV battery to the electric grid. Although, the patterns/shapes reflected by representative load-curve data may depend on other factors (such as the data time-scale), electrical properties (e.g., loads) for EV batteries can be similar enough that EV ownership inferences can be drawn from load-data.

As illustrated in the example of FIG. 1, connection of an EV battery to the electric grid can be followed by patterned increases in power draw (e.g., between 1 and 2 kW). Additionally, once an EV battery has reached a maximum charge, the charging is stopped, resulting in a similarly marked decrease in AMI load. Accordingly, in some implementations, EV connection (and thus ownership status) may be inferred from patterns or shapes occurring in AMI load data.

In another aspect, information about the time elapsed between charging events may indicate a higher likelihood (or lower likelihood) that a customer is an EV owner. For example, EV batteries are typically charged only after being near depletion, thus there is some amount of time expected to elapse between sharp subsequent battery charging, as well as the associated increases (and decreases) in AMI load. The AMI graph in the example of FIG. 1 is shown on an hourly timescale (x-axis), however it is understood that other time resolutions may be used to analyze AMI data, without departing from the scope of the subject technology. In some implementations, smaller timescales, yielding a higher AMI resolution, may provide more accurate predictions of EV ownership status.

Although AMI data patterns can be used to inform models for predicting EV ownership status, other types of data and/or assumptions can also be used. For example, in some implementations a predictive EV ownership model of the subject technology may employ a machine learning algorithm to further modify/update the model based on the correctness/incorrectness of previous EV ownership predictions. Although various machine-learning implementations can be used, some aspects of the subject technology may implement learning models using logistic regression, Bayesian networks, neural networks, and/or support vector machine (SVM) implementations, etc.

Figure 2:
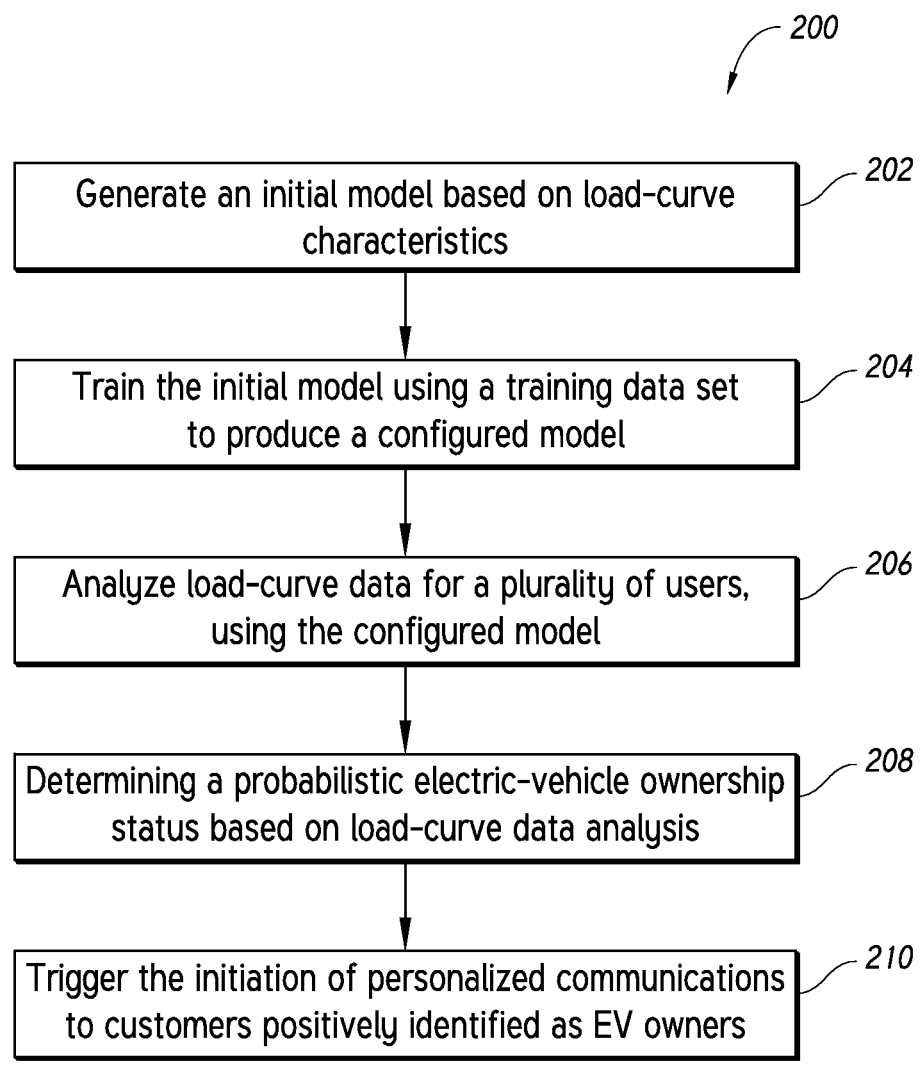
FIG. 2 illustrates steps of an example method for generating and implementing a predictive model for determining an EV ownership status, according to some implementations of the technology.

FIG. 2 illustrates steps of an example method 200 for generating and implementing a predictive model, for example, to determine EV ownership status for one or more power users/entities/consumers. Method 200 begins with step 202, in which an initial model is generated, for example, based on load curve characteristics that are known to positively (or negatively) correspond with EV ownership status. In some aspects, the initial model can be a predictive model for classifying EV ownership status (e.g., as "owners" or "non-owners"), using one or more input data types, such as AMI data.

Depending on implementation, the initial model can be generated based on different characteristics or assumptions. For example, the initial model may be generated based on AMI load curve characteristics, similar to those discussed above with respect to FIG. 1, i.e., that EV battery charging can correspond with predictable load increases/decreases (e.g., 1-2 kW). Other load-curve characteristics can include load-curve decay (e.g., possibly indicating that an EV charge has been completed), and/or a predetermined spacing in time between different load curve increases/decreases, that may represent separate and discrete charging events.

Subsequently in step 204, the initial model is "trained" using a training data set. Training of the initial model is performed to further modify (or tune) the initial model using input data for which associated EV ownership classifications are already known. That is, the training data set includes AMI data, various types of associated demographic and/or temperature data, and higher-order features derived from these data sources for which corresponding EV ownership classifications are already known. Higher-order features could include derivatives of usage curves, results from algorithms designed to detect large usage onsets that are followed soon after by large usage declines, results from peak-finding algorithms, the time cadence distribution of usage surges (collection of estimates of the time interval between candidate "charges"), the energy distribution of usage surges (collection of estimates of the amount of energy used per candidate "charge"), seasonal extrapolated heating and cooling usage, and seasonal baseline usage, etc. Ongoing feature weighting, design, and selection are guided by the need for expressive features that contribute significantly to predictive power but can still be successfully trained using the existing data sets of known EV ownership.

Training of the initial model can include providing various data inputs, such as customer AMI data and receiving EV ownership classification outputs. The classification outputs are then compared to the known EV ownership status corresponding with the respective input. In instances where EV ownership classification outputs match the known EV ownership status, little or no changes/updates to the model are made. That is, accurate predictions/classifications made by the model can result in little (or no) feedback to model weights or architecture, having little or no effect on the model's mapping from an input layer to a classification output. Alternatively, if the predicted output of the model is different from the expected (known) output, the resulting feedback can be used to more greatly affect one or more characteristics. The amount of changes/updates that are provided for a wrong output classification can depend on an amount of error associated with the corresponding incorrect classification.

Prediction outputs of the model can include a quantitative value or output "score," indicating a probabilistic confidence for a particular classification type, e.g., "EV-owner or "non-EV owner." In such instances, a predetermined threshold may be used to map the output score into a binary classification, e.g., indicating either an EV-owner or a non-EV owner status. By way of example, an output score may correspond with a probability that the associated entity is an EV-owner and quantitatively represented by a range of values in the interval '0' (i.e. certainty of non-EV owner status) to '1' (i.e. certainty of EV-owner status). To make a binary classification, values less than, or equal to 0.40 may be classified as "non EV-owner," whereas values greater than 0.40 may be classified as "EV-owner."

Once the initial model is trained using the training data set, method 200 proceeds to step 206, in which the resulting "configured model" is used to analyze load-curve data for users for which EV ownership status is unknown. Analysis of novel load-curve data can be performed when AMI load curve data for users is provided as an input to the configured model. Although AMI load curve data can be provided for one or more users, it is understood that additional information inputs for each user/customer may be supplied. By way of example, any type of customer data (e.g., age, geographic location, home size, income level and/or cohabitation status, etc.) may be provided. Additionally, other information about the users (e.g., solar-panel ownership status, swimming pool ownership status, etc.), or user-independent information (e.g., weather data, temperature data), may be provided.

As discussed above, analysis of load-curve data can be performed using a machine learning implementation, such as a neural-network or pattern recognition technique. For example, in step 208, a probabilistic EV ownership status is determined for one or more customers associated with data inputs analyzed in step 206.

Output of the configured model (indicting an EV ownership status) can take various forms, as discussed above. For example, EV ownership status determinations can be provided as a binary classification label, such as, "EV owner" or "non-EV owner." Alternatively, classification results of the configured model can provide a relative probability or quantitative indication of an ownership status. Consequently, numeric results above a particular predetermined threshold can be associated with different classification labels, such as "Owner" or "non-Owner."

Once classifications are made for one or more users for whom EV ownership status is yet unverified, the ownership classifications can be used to drive determinations regarding: (1) whether or not a particular customer is to be contacted, for example, regarding his/her EV charging habits, and (2) the information content of any customer communications.

Certain parties, such as utility companies, may benefit from encouraging electric-vehicle owners to charge their automobiles during certain hours of the day, e.g., during off-peak hours, when strain on the electric grid is at a minimum. By determining likely EV owners using the configured model, utility companies can better provide targeted customer communications, for example, to encourage EV owners to subscribe to incentive-based rate plans that benefit EV charging at particular times and/or a summary of their EV charging costs and energy use.

Additionally, by being able to disaggregate EV charging from other types of power consumption, non-owners may also be targeted for personalized communications. For example, EV ownership determinations can be used by electric-vehicle manufacturers interested in providing targeted advertisements or other communications to potential customers that do not already own electric-vehicles. Because determinations made by the configured model are approximate classifications, any data confirming a proper (or improper) classification can be used to update and improve the configured model's accuracy.

In some implementations, EV ownership status can be determined without the use of a machine-learning model. For example, in some implementations, usage interval data (e.g., load curve data) may be analyzed to detect certain patterns or features known to correlate with an EV charging event. In some aspects, the existence of such events can increases a confidence (or likelihood) that a corresponding consumer/user is an EV owner.

By way of example, usage interval data may be analyzed to compare features of the usage interval data with a set of known reference usage characteristics, such as, power consumption characteristics for known EV owner's. Depending on implementation, different usage characteristics may be used. Such characteristics can include, but are not limited to: predetermined increases/decreases in power load (e.g., 1-2 kW), a frequency of power draw increase/decrease events, and/or an average time lapse between such events, etc.

Figure 3:
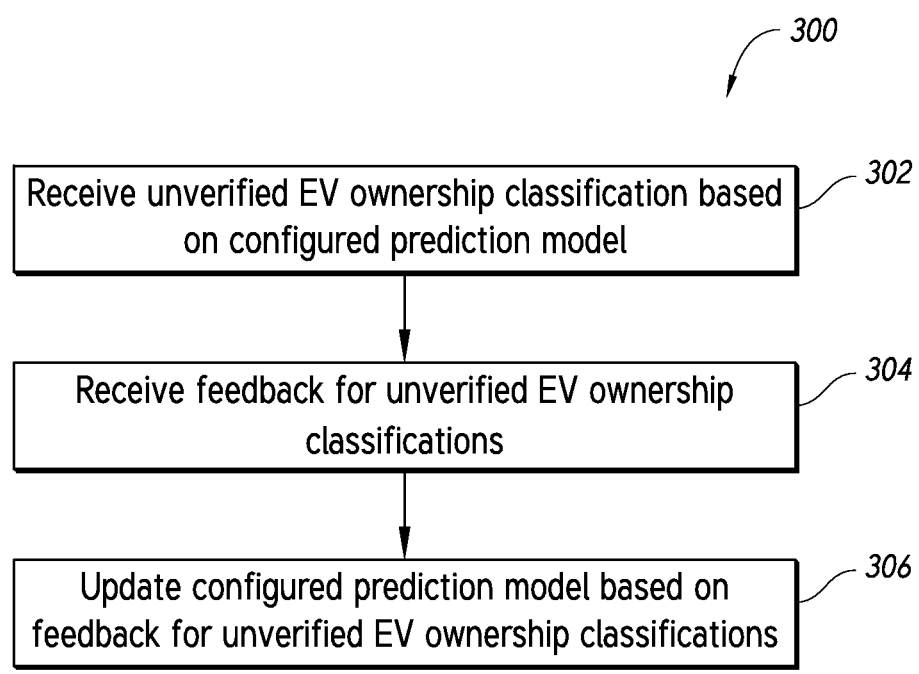
FIG. 3 illustrates steps of an example method for training/updating a predictive model, based on known EV ownership outcomes, according to some aspects of the technology.

FIG. 3 illustrates steps of an example method 300 for training/updating a predictive model, based on known EV ownership outcomes. Method 300 begins with step 302, in which an unverified (unconfirmed) EV ownership classification is received. The unconfirmed EV ownership classification can be the result of classifications made with respect to one or more customers, for example, based on load-curve data (e.g., AMI data) or other data such as demographic data.

In step 304, feedback (verification) for the unverified EV ownership classifications is received. EV ownership verifications can be received from a variety of sources, or inferred from a variety of customer behaviors/actions. For example, customers that opt-in to EV rate programs may be considered to have been properly identified as EV owners (e.g., correct positive identification). By way of further example, a possible indicator of non-owner status could be determined if a particular customer's consumption never fluctuates above a threshold amount (e.g., 1-2 kW). That is, if power draw for the customer is consistently within a narrow band, then the customer is unlikely to own an EV.

Alternatively, any indications that a positively classified EV owner does not, in fact, own an electric-vehicle, can indicate an improperly identified EV owner (e.g., an incorrect positive identification). Classified non-owners that are determined to, in-fact, own electric-vehicles can be determined to have been erroneous negative identifications. Likewise, classified non-owners that are determined to have been properly categorized are determined to have been positive negative identifications. As discussed above, any data that confirms a proper (or improper) EV classification can be used to update/improve the configured model.

In step 306, such information is used as feedback, e.g., to a neural-network of the classified model, in order to update or further "train" the neural-network to improving ongoing classification accuracy. By training the configured model as verification data becomes available, outputs of the configured model increase in accuracy over time.

Figure 4:
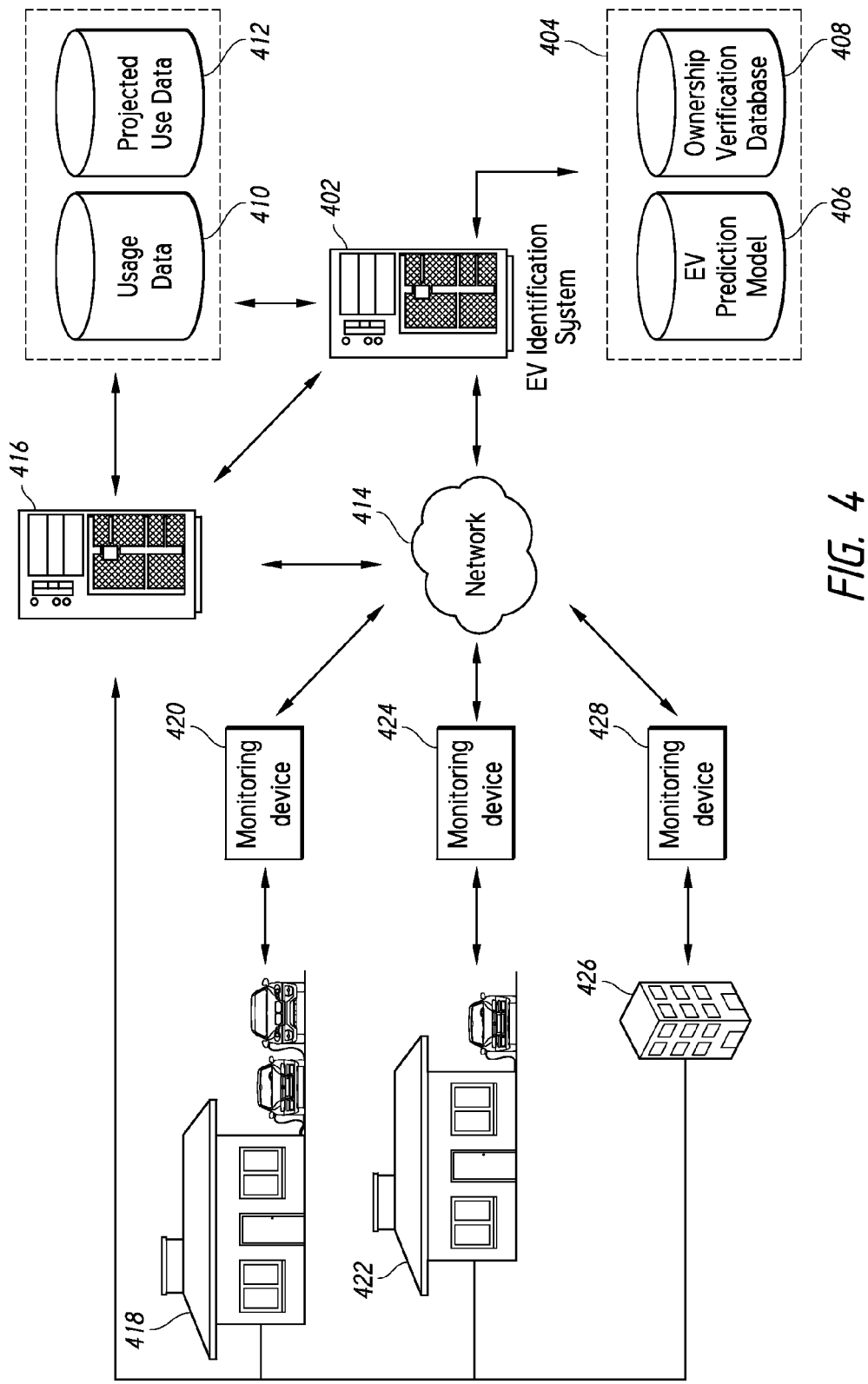
FIG. 4 conceptually illustrates various hardware and/or software modules of an example system that can be used to implement some aspects of the technology.

FIG. 4 conceptually illustrates an environment 400 that can be used to implement an EV identification system 402, according to some aspects of the technology. Environment 400 includes EV identification system 402 that includes software and/or hardware modules for implementing classification system 404. As illustrated, classification system 404 includes EV prediction model 406 and ownership verification database 408. Environment 400 also includes network 414, advanced metering infrastructure (AMI) data collection system 416, homes (418, 422), a business 426, and monitoring devices (420, 420, and 428).

EV identification system 402 can be communicatively coupled to collection system 416, either directly (e.g., using a wired or wireless means) or indirectly, via network 414. As illustrated, network 414 connects each of monitoring devices (420, 424 and 428) to collection system 416 and/or EV identification system 402. It is understood that other systems, including software/hardware modules and/or networks may be used to implement environment 400 of the subject technology. Similarly, additional monitoring devices and/or electric-vehicles may be present, without departing from the subject technology.

In practice, EV identification system 402 is configured to build/generate, update and/or implement a configured model for use in determining an EV ownership status, e.g., for entities associated with AMI data inputs. AMI data can be received directly by EV identification system 402, for example, from one or more of monitoring devices 420, 424, and/or 428. Alternatively, in some approaches, some (or all) of the AMI data is received from a collection system (e.g., collection system 416), which may be maintained/operated by a third-party, such as a utility provider.

Each of the monitoring devices 420, 424, and/or 428 can monitor power usage for a corresponding entity 418, 422, and 426. As used herein, an entity can refer to any physical structure or property to which power is provided. Thus, an entity may refer to, for example, a home, a building, business, point of interest, etc.

Each of monitoring devices 420, 424, and/or 428 can measure, collect, and/or analyze commodity usage (e.g., power usage) of an entity with which the device is associated. For example, the monitoring device 420 can be configured to measure, collect, and/or analyze the energy usage of the entity 418. A monitoring device can be any device, such as a processor based device, that is configured to collect and/or measure the usage of a given commodity, such as electric power.

In some aspects, examples of monitoring devices can include smart meters, smart thermostats, electricity meters, gas meters, heat meters, and/or water meters, etc. In some implementations, EV identification system 402 can communicate with each of the monitoring devices 420, 424, and 428, to obtain usage data for the respective entities 418, 422, and 426. Such communication may be performed on an as needed basis, periodically, or based on a defined schedule. In various embodiments, EV identification system 402 may utilize an advanced metering infrastructure (AMI) to facilitate the measuring, collection, and/or analysis of usage data.

In other aspects, data collected by each of monitoring devices 420, 424, and 428, may be provided to collection system 416, before it is received by EV identification system 402, for example via network 414.

Collection system 416 can track energy usage from different geographic regions using the monitoring devices associated with each entity in the corresponding region. In some aspects, collection system 416 may receive usage data that includes energy consumption amounts (e.g., kWh) for the corresponding utility account. In some embodiments, collection system 416 can obtain the usage data by pulling the usage data from each of the monitoring devices. Alternatively, the monitoring devices may broadcast usage data on a periodic or scheduled basis. Collection system 416 also may receive usage data from each monitoring device through a wired communication system, such as network 414.

In practice, EV identification system 402 can be configured to generate, implement and/or train a configured model of the subject technology, e.g., to identify EV owners based on AMI data. As discussed above, EV identification system 402 can be used to generate an initial model based on load curve characteristics that are known to positively (or negatively) correspond with EV ownership status. In some approaches, the initial model is a predictive model for classifying EV ownership status (e.g., as "owners" or "non-owners"), using one or more input data types, such as AMI data.

The initial model can be generated based on different characteristics or assumptions. For example, the initial model may be generated from AMI load-curve characteristics that are received from one or more of monitoring devices 420, 424 and/or 428.

Once acquired, EV identification system 402 can train the initial model, for example, using a training data set stored on (or accessible from) EV identification system 402. As discussed above, training of the initial model can be performed to modify the initial model using input data for which associated EV ownership classifications are known, e.g., using stored associations residing in ownership verification database 408.

Once the initial model is trained using the training data set, EV identification system 402 can produce and implement a "configured model" to analyze load-curve data for entities/users (e.g., entities 418, 422, 426) for which EV ownership status is unknown. Analysis of novel load-curve data can be performed when AMI load curve data for entities/users is provided as an input to the configured model. Although AMI load curve data can be provided for one or more entities, it is understood that additional information for each entity may be supplied as inputs to the configured model implemented by EV identification system 402.

As discussed above, analysis of load-curve data can be performed by EV identification system 402 using a machine learning implementation, such as a neural-network or pattern recognition technique. Output of the configured model, can take various forms, such as a binary classification or quantitative value for indicating a relative likelihood of an "EV Owner" or "non-EV Owner" status, as discussed above.

Once classifications have been made for one or more users (for whom EV ownership status is yet unverified), the ownership classifications can be used by EV identification system 402 or by collection system 416, for example, to determine whether or not a particular entity should be contacted regarding his/her EV charging habits.

As discussed above, utility companies may benefit from the ability to identify EV owners from among non-owners for the purpose of encouraging them to charge their automobiles during certain hours of the day.

Some implementations include electronic components, such as microprocessors, storage and memory that store computer program instructions in a machine-readable or computer-readable medium (alternatively referred to as computer-readable storage media, machine-readable media, or machine-readable storage media).

Examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

Computing systems can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for identifying electric-vehicle owners, comprising:
    generating an initial model based on a plurality of power load-curve characteristics;
    training the initial model using a training data set to produce a configured model, wherein the training data set comprises load curve data associated with a first plurality of users for whom electric-vehicle ownership status is known; and
    determining a probabilistic classification for each of a second plurality of users by analyzing load-curve data associated with the second plurality of users using the configured model.

2. The computer-implemented method of claim 1, further comprising:
    sorting the second plurality of users into two or more electric-vehicle (EV) ownership status categories based on the probabilistic classification.

3. The computer-implemented method of claim 2, wherein the two or more EV ownership status categories comprises:
    a first user group representing one or more users from among the second plurality of users for whom a probability of EV ownership is determined to exceed a predetermined threshold; and
    a second user group representing one or more users from among the second plurality of users for whom a probability of EV ownership status is determined to be below the predetermined threshold.

4. The computer-implemented method of claim 1, further comprising:
    facilitating a transmittal of one or more personalized communications for each of one or more of the second plurality of users based on the probabilistic classification for each of the second plurality of users.

5. The computer-implemented method of claim 1, wherein generating the initial model further comprises:
    generating the initial model using one or more load-curve independent factors including:
    demographic information for one or more of the of users and weather data.

6. The computer-implemented method of claim 1, further comprising:
    receiving an ownership status indication for one or more of the second plurality of users; and
    updating the configured model based on the ownership status indication for each of the one or more of the second plurality of users.

7. The computer-implemented method of claim 1, wherein the load-curve data associated with the second plurality of users comprises Advanced Metering Infrastructure (AMI) data.

8. A system for classifying electric-vehicle (EV) ownership status, comprising:
    one or more processors; and
    a computer-readable medium comprising instructions stored therein, which when executed by the processors, cause the processors to perform operations comprising:
        receiving usage interval data associated with a first plurality of users for whom an EV ownership status is unknown;
        analyzing the usage interval data to identify one or more potential EV charging characteristics;
        comparing the one or more potential EV charging characteristics to a set of reference characteristics; and
        identifying at least one EV owner from among the first plurality of users based on the comparison of the one or more potential EV charging characteristics to the set of reference characteristics.

9. The system of claim 8, further comprising:
    generating a notification to the at least one EV owner from among the first plurality of users, the notification comprising content regarding an EV charging incentive program.

10. The system of claim 8, the comparison of the one or more potential EV charging characteristics to the set of reference characteristics is performed using a machine-learning model.

11. The system of claim 8, further comprising:
    associating the at least one EV owner from among the first plurality of users with an EV ownership label.

12. The system of claim 8, wherein the one or more potential EV charging characteristics comprises a power-draw increase between 1 kW and 2 kW.

13. The system of claim 8, wherein the one or more potential EV charging characteristics comprises an indication of EV charging frequency.

14. The system of claim 8, wherein the usage interval data is derived from Advanced Metering Infrastructure (AMI) data.

15. The system of claim 8, wherein the usage interval data provides power consumption information on an hourly basis.

16. A non-transitory computer-readable storage medium comprising instructions stored therein, which when executed by one or more processors, cause the processors to perform operations comprising:

receiving usage interval data associated with a first plurality of users for whom an EV ownership status is unknown;

analyzing the usage interval data to identify one or more potential EV charging characteristics;

comparing the one or more potential EV charging characteristics to a set of reference characteristics; and identifying at least one EV owner from among the first plurality of users based on the usage interval data and the set of reference characteristics.

17. The non-transitory computer-readable storage medium of claim 16, further comprising:

generating a notification to the at least one EV owner from among the first plurality of users, the notification comprising content regarding an EV charging incentive program.

18. The non-transitory computer-readable storage medium of claim 16, the comparison of the one or more potential EV charging characteristics to the set of reference characteristics is performed using a machine-learning model.

19. The non-transitory computer-readable storage medium of claim 16, further comprising:

associating the at least one EV owner from among the first plurality of users with an EV ownership label.

20. The non-transitory computer-readable storage medium of claim 16, wherein the one or more potential EV charging characteristics comprises a power-draw increase between 1 kW and 2 kW.

* * * * *